UNITED STATES PATENT OFFICE.

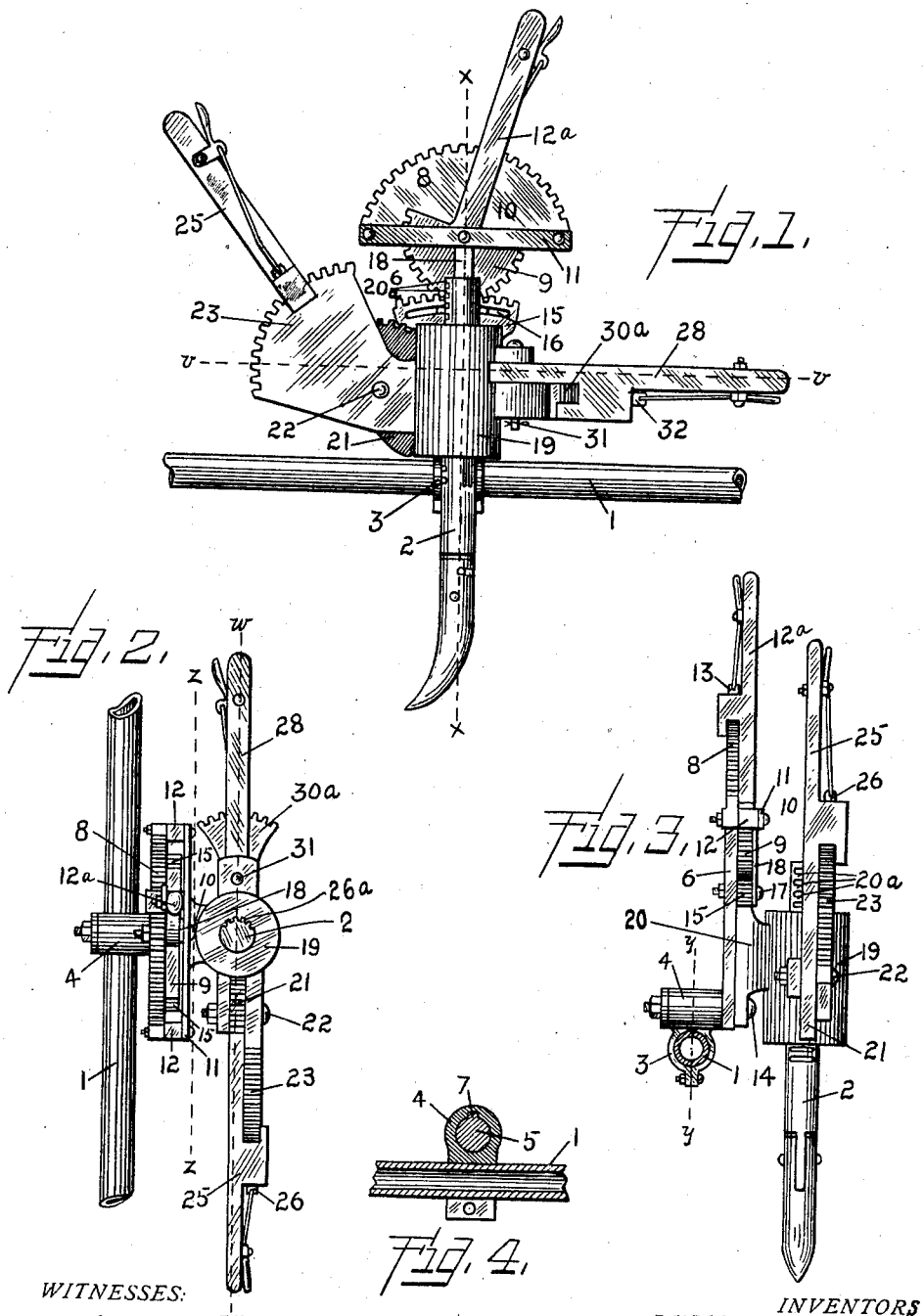

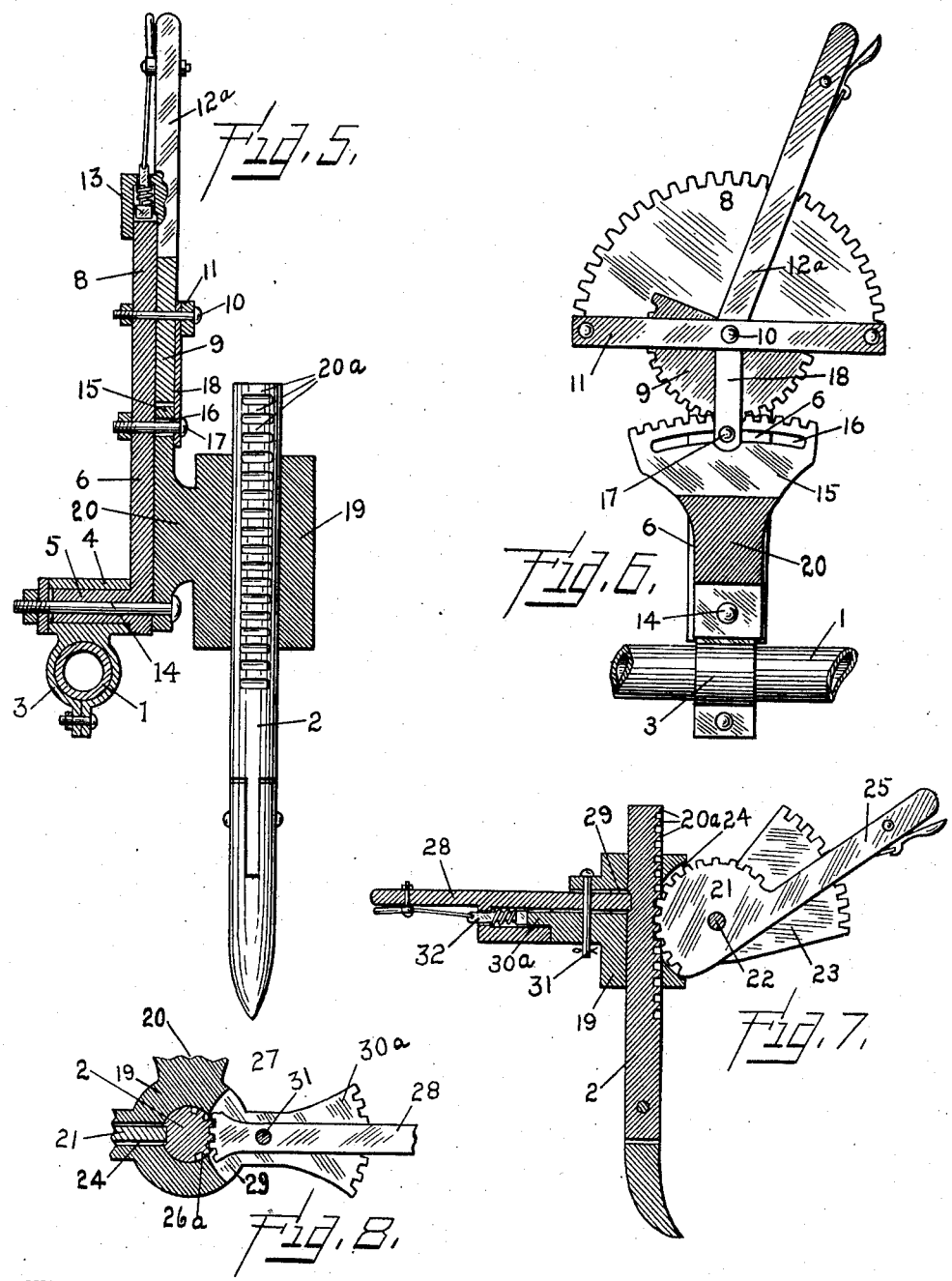

WILLIAM V. CROUCH AND McELVY S. CROUCH, OF ARLINGTON, TEXAS, ASSIGNORS OF ONE-THIRD TO H. G. MARTIN, OF ARLINGTON, TEXAS.

CULTIVATOR ATTACHMENT.

1,043,044.  Specification of Letters Patent.  Patented Oct. 29, 1912.

Application filed December 12, 1911. Serial No. 665,298.

*To all whom it may concern:*

Be it known that we, WILLIAM V. CROUCH and McELVY S. CROUCH, citizens of the United States, residing at Arlington, in the county of Tarrant and State of Texas, have invented certain new and useful Improvements in Cultivator Attachments, of which the following is a specification.

Our invention relates to new and useful improvements in adjustable cultivator feet.

It is well known to those familiar with the use of a cultivator that an essential feature of the implement lies in supporting the plow feet from the cultivator beams in such a manner, that the plows may be adjusted up and down or swung back and forth at various angles with the vertical, or rotated partially about a vertical axis. Such adjustment is determined by the crop for which the ground is being prepared, and by the hardness of the ground and various other considerations. In the present practice, such adjustment must be obtained by loosening certain clamping bolts which serve to hold the plow shanks rigid. The use of a wrench is therefore necessary, and considerable skill is moreover required to properly regulate the positions of the plows. Unless the operator is thoroughly familiar with his machine a considerable amount of time may be spent in fixing the plow shanks at the desired angles and elevation.

It is the object of the present invention therefore to provide a mechanism by which a cultivator foot may be adjusted either vertically or swung forward or backward at an inclination with the vertical, or partially rotated about its vertical axis.

The object is further to provide a device that will permit a cultivator foot to be adjusted in the manner specified, by the manipulation of certain levers thereby eliminating the annoyance and loss of time occasioned by loosening bolts as is necessary in adjusting the cultivator feet now commonly used.

A still further object of the invention is to provide a mechanism for adjusting a cultivator foot as above described, that will accomplish either a small or a large adjustment in the same length of time and in a single operation.

Finally the object of the invention is to provide a device of the character described that will be strong, durable, simple and efficient and comparatively easy to construct, and also one that will not be likely to get out of working order.

With these and various other objects in view, our invention relates to certain novel features of the construction and operation, an example of which is described in the following specification and illustrated in the accompanying drawings, wherein:

Figure 1 is a side elevation of the adjustable cultivator foot, the same being shown secured to a beam transverse with the direction from which the object is viewed. Fig. 2, is a top view of the device. Fig. 3, is a front view of the same, the direction of sight for this view being parallel with the beam. Fig. 4, is a sectional detail taken upon the line $y$—$y$ of Fig. 3, and showing the bracket member by which the device is secured to the beam and the key employed to hold a certain portion of the device rigid with said beam. Fig. 5 is a transverse vertical sectional view taken upon the line X—X of Fig. 1. Fig. 6, is a vertical sectional view taken upon the line Z—Z of Fig. 2, the sectional plane being parallel with the beam. Fig. 7 is a vertical sectional view taken upon the line W—W of Fig. 2, the plane of section being again parallel with the beam. Fig. 8 is a horizontal sectional view taken upon the line of Fig. 1.

Referring now more particularly to the drawings, wherein like reference characters designate similar parts in all the figures, the numeral 1, denotes a cultivator beam and 2 a plow foot supported by said beam and adapted to undergo various adjustments as will presently be made clear. For attaching the adjusting mechanism to the beam, a bracket is employed comprising a split collar 3 adapted to be clamped to the beam, and a tubular socket 4 integral with the collar 3 and transverse therewith. The socket 4 receives a stud 5, carried integrally at the lower extremity of a vertical bar 6, and restricted from rotation in its correlated socket by a key clearly shown in Fig. 4. Upon the top of the bar 6 is integrally surmounted a semi-circular toothed plate, the diametrical edge of said plate being horizontal, and its toothed edge uppermost. Another semi-circular toothed plate 9, considerably smaller than the plate 8 is rotatably mounted at the center of the last named plate upon a short spindle 10, the toothed edge of the plate 9 facing downward. The spindle 10 after projecting through the center of the plate 9 extends slightly beyond said plate, its projecting portion being journaled at the center of a horizontal bar 11, diametral with the plate 8 and held spaced therefrom by small blocks 12 interposed between said plate and the extremities of the bar. The bar 11 adds strength to the construction and eliminates the possibility of the spindle 10 being bent or broken, as might possibly occur if said spindle were supported from one extremity only. A lever 12ª projects diametrally upward from the plate 9, furnishing a means by which said plate may be manually subjected to a partial rotation. The common expedient of a spring pressed plunger 13, acting in conjunction with the toothed plate 8, is employed to hold the lever 12ª fixed in its various positions of adjustment.

A bolt 14 is passed centrally through the stud 5, said bolt being provided with the usual head at one end and with a nut and washer at the other, which last named parts restrict the stud from being displaced from its correlated socket 4. The head extremity of the bolt is projected somewhat beyond the lower end of the bar 6, and upon this projecting portion is pivoted the lower end of a toothed quadrant 15, the teeth of which engage those of the plate 9. It is thus apparent that any rotation to which the plate 9 may be subjected will produce a corresponding rotation of the quadrant 15 about its pivotal support. A circular slot 16 is provided adjacent and parallel to the toothed edge of the quadrant 15, which slot receives the projecting end of a bolt 17, passing through the bar 6, and fixed in said bar. A short strip of metal 18 contiguous with the outer surfaces of the parts 9 and 15 has its extremities pivoted upon the members 10 and 17, said strip forming a swinging link between said members. This construction serves to hold the intermeshed teeth of the plate 9 and 15 securely in mesh preventing relative outward displacement between said plates.

A socket member 19 substantially vertical is integral with the quadrant 15, said socket member being spaced slightly from the quadrant and being connected with the center portion thereof by a neck 20. The plow foot 2 is received by the socket 19, and is adapted to undergo vertical adjustment in said socket as will presently be explained. Since the toothed plates 9 and 15 are intermeshed and since the socket 19 is integral with the plate 15, it is apparent that the machine operator by manipulating the lever 12ª projecting from the plate 9, can adjust the socket 19 and the plow foot contained therein at various angles with the vertical, this angular adjustment taking place in a vertical plane parallel with the cultivator beam 1. A rack 20ª is formed upon the front side of the plow foot 2, the teeth of said rack being transverse with the foot. This rack is engaged by a semi-circular toothed plate 21 pivoted as indicated at 22 upon the reduced or inner portion of a quadrant 23 projecting integrally forward from the socket 19. A vertically extending slot 24 provided at the front side of said socket receives that portion of the plate 21 which has toothed engagement with the rack 20ª. A lever 25 projecting rearwardly and upwardly from the toothed plate 21 furnishes a means by which said plate may be manually subjected to a partial rotation for the purpose of raising or lowering the plow foot. In order to hold the lever in its various positions of adjustment, a spring pressed plunger is again employed, the same acting in conjunction with the quadrant 23.

A description will now be given of the means employed to subject the plow foot to a partial rotation within its socket.

At the rear side of the plow foot opposite to the rack 20ª, there are provided a plurality of elongated corrugations 26ᴬ so proportioned and spaced as to have toothed engagement with a small quadrant 27 carried by one extremity of a horizontal lever 28 perpendicular to the plow foot and extending rearwardly therefrom. That extremity of the lever which carries the quadrant projects through a horizontal slot 30 provided in the rear portion of the socket 19, thus coming into engagement with the corrugations 26. The lever is pivoted upon the inner or reduced extremities of a quadrant 30ᴬ, the pivot being formed by a bolt 31. As in the cases previously described, a spring-pressed plunger 32 is mounted upon the lever 28, and is adapted to engage the teeth of the quadrant 30 to hold the lever in various positions of adjustment.

From the above description it is apparent that the three levers 12ª, 25, and 28 operate independently of each other each performing its individual functions, and each being adapted to be subjected to any adjustment in one operation, and within an instant's time. It is to be observed that the corrugations 26 are sufficiently elongated to be engaged by the quadrant 27, in any position or vertical adjustment of the plow foot. It may also be noticed that the teeth forming the rack 20ª encircle the plow foot for a sufficient distance to permit their being engaged by the quadrant 21 in any position of rotary adjustment to which the plow foot may be subjected.

It is obvious that various changes may be made in the form and proportion of parts and details of the above described invention without departing from the spirit or sacrificing the advantages thereof, and the device is therefore presented as including all such modifications and changes as come within the scope of the following claim.

What we claim is:—

In a device of the character described, the combination with a cultivator beam, of a socket member pivotally supported by said beam, the pivotal axis being horizontal and transverse of the beam, a plow foot mounted in said socket and adapted to be adjusted as to its position within the socket, a series of vertical corrugations being provided at one side of the plow foot and a rack of transverse teeth at the other side, pivoted quadrants engaging said rack and said corrugations, grooves being provided in the socket to permit this engagement, means by which said quadrants may be manually subjected to partial rotation and held in various positions of adjustment, and a manually operated means for swinging said socket about its pivotal axis and holding it in various positions of adjustment.

In testimony whereof we have signed our names to this specification in the presence of two subscribing witnesses.

WILLIAM V. CROUCH.
McELVY S. CROUCH.

Witnesses:
D. C. RAMSEY,
J. S. MURRAY.

Copies of this patent may be obtained for five cents each, by addressing the "Commissioner of Patents, Washington, D. C."